A. G. JONES.
PROTECTIVE DEVICE.
APPLICATION FILED OCT. 10, 1911.
1,024,857.
Patented Apr. 30, 1912.
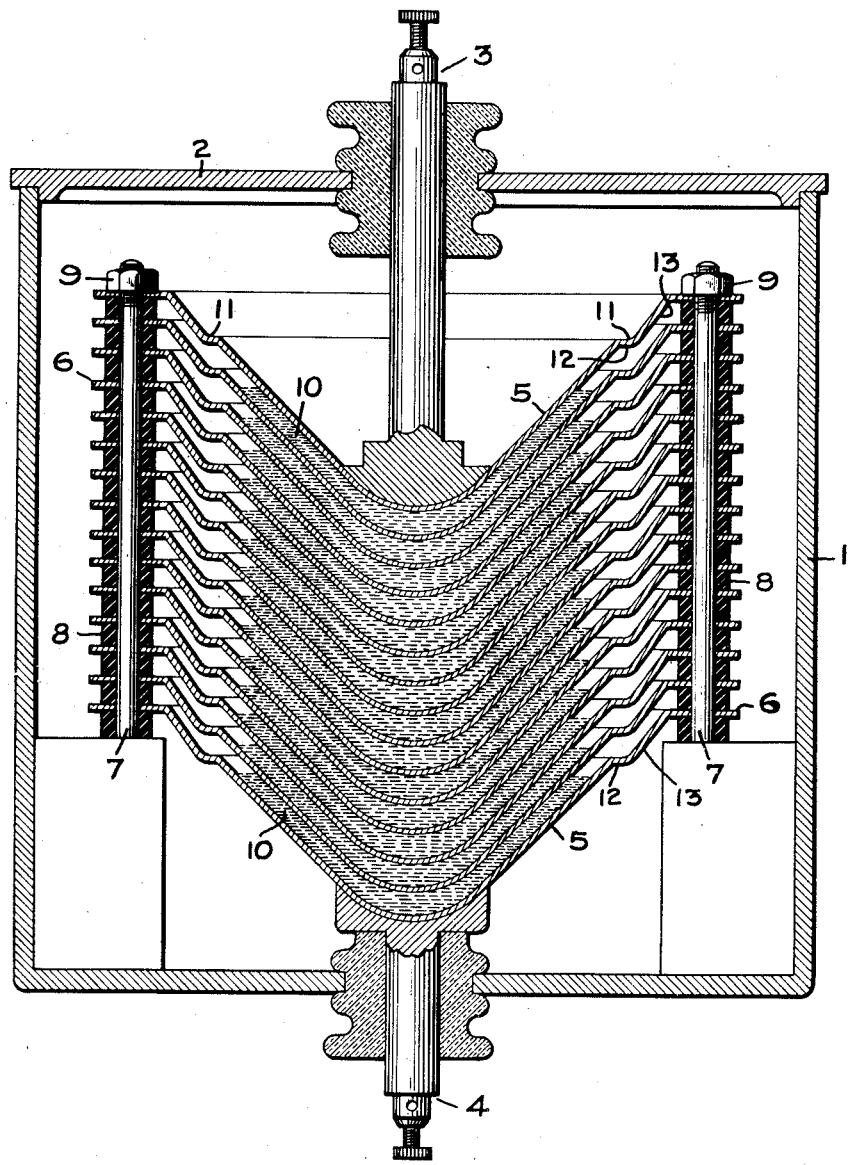
Witnesses:
Earl G. Klock.
J. Ellis Glen
Inventor
Allen G. Jones,
by
His Attorney

UNITED STATES PATENT OFFICE.

ALLEN G. JONES, OF SAN FRANCISCO, CALIFORNIA, ASSIGNOR TO GENERAL ELECTRIC COMPANY, A CORPORATION OF NEW YORK.

PROTECTIVE DEVICE.

1,024,857.  Specification of Letters Patent.  Patented Apr. 30, 1912.

Application filed October 10, 1911. Serial No. 653,943.

*To all whom it may concern:*

Be it known that I, ALLEN G. JONES, a citizen of the United States, residing at San Francisco, county of San Francisco, State of California, have invented certain new and useful Improvements in Protective Devices, of which the following is a specification.

My invention relates to electrolytic cells having electrodes mounted adjacent each other with electrolyte between them, and more particularly to electrolytic cells used as protective devices or lightning arresters to protect transmission lines and similar electric conductors from abnormal potentials due to lightning, surges and similar phenomena.

A form of electrolytic cell commonly used as a lightning arrester or protective device for transmission systems comprises a number of aluminum electrodes, usually made in the form of cones or cups, nested within each other and having between them some suitable electrolyte. This stack of cones is immersed in an iron tank containing oil or similar insulating fluid, one end of the stack being connected to the line to be protected and the other end to ground. A very heavy discharge through an arrester of this kind will cause the electrolyte to be thrown from between the aluminum electrodes out into the oil and often into contact with the iron oil tank, grounding the system and often causing the arrester severe short circuits which may destroy the arrester.

The object of my invention is to provide an electrolytic cell or protective device in which the escape of electrolyte from between the electrodes is rendered very difficult; in which other suitable obstructions hinder and to a large extent prevent the electrolyte flowing outward from between the electrodes; in which the obstructing or baffling of the electrolyte is done in a very simple and reliable manner by so shaping the electrodes, as, for instance, by crimping or corrugating them, that the electrolyte when flowing from between the electrodes must follow a very tortuous and obstructed path; and which is an improvement in devices of this character in other features more fully hereinafter set forth.

My invention will best be understood in connection with the accompanying drawing which merely for purposes of illustration shows one of the various forms in which my invention may be embodied and which is a longitudinal cross section of an electrolytic cell or lightning arrester suitable for protecting a transmission line.

In the particular form of lightning arrester shown in the drawing the principal parts of the arrester are inclosed in an iron tank or casing 1 containing oil or other suitable insulating fluid, and provided with a top 2 in which is mounted a suitable terminal 3 which may be connected to the line to be protected, a similar terminal 4 for connection to ground extending through the bottom of the tank. A plurality of electrodes 5 of aluminum or some metal having similar properties and preferably made in the form of cups or cones are mounted in the tank 1 so that their surfaces are substantially parallel with one another, as shown in the drawing. While the electrodes may be mounted in various ways the preferred construction is that shown, in which each electrode is provided with a perforated flange 6. The electrodes are positioned with reference to one another to form a stack by wooden supporting rods 7 which pass through the perforations in the flanges. The electrodes are spaced definite distances from one another by insulating spacers 8 in the form of washers placed on the rod 7 between the flanges 6 of the electrodes. The nest or stack of cones or electrodes is firmly held in position by nuts 9 on the upper end of the rods 7. The electrodes 5 are separated from one another by some suitable electrolyte 10 which separates each electrode from the one immediately above it and partially fills the cup shaped electrode, so that the surface of the electrolyte in each electrode is below the flange 6 of the electrode.

When a heavy discharge takes place through a lightning arrester of the type just described the electrolyte 10 is ejected from between the electrodes 5, flowing radially of the electrodes toward their edges with sufficient velocity to throw the electrolyte into contact with the iron tank 1, thereby causing short circuits or bad grounds on the system. In accordance with my invention the escape of the electrolyte 10 from between the electrodes is greatly hindered and practically prevented by rendering the passages through which the electrolyte must flow in order to escape from between the electrodes so obstructed or tortuous that the direction of flow of the moving electrolyte is changed a number of times as it flows through the passage and hence the electrolyte is gradually brought to rest and flows back into the cup shaped electrode without ever having passed out between the flanges 6 of the electrodes. The passage for the electrolyte may be rendered tortuous in many different ways, and the desired obstructions or baffles in the passage may be made in various forms, but in the preferred form of my invention, as illustrated in the drawing, the electrodes 5 are bent or shaped to secure the desired form of passage, preferably by crimping or bending the electrodes 5 at a point between the flange 6 and the surface of the electrolyte 10 to form a circumferential crimp or corrugation 11 which extends around the electrode a short distance below the flange 6. I have shown only one crimp or corrugation in each electrode but parallel crimps or corrugations may be formed in the electrodes 5 above the surface of the electrolyte 10, if considered necessary, although ordinarily one crimp or corrugation 11 is sufficient. In order to keep the distance between the electrodes 5 as uniform as possible, I prefer to make the crimp 11 with flat sides 12 and 13, as shown in the drawing.

As a result of crimping or corrugating the electrode as above described and as shown in the drawing, each electrode 5 has in its upper side above the surface of the electrolyte 10 and near the flange 6 a trough or depression, while the same electrode has on its lower side and in the same position a ridge or projection. As the electrodes are mounted parallel to one another and have a common axis, the trough or depression on the upper side of one electrode is immediately below the ridge or projection of the electrode immediately above it. To a certain extent the ridge of one electrode projects into the trough of the electrode below it and obstructs the flow of electrolyte from the middle of the electrode through the flanges 6, as the electrolyte in flowing outward over the ridge of one electrode and through the trough of the electrode beneath must pass through a tortuous passage in which its direction of flow is considerably changed and in which it is baffled and brought to rest.

The operation of the device is as follows: When a heavy discharge takes place through the arrester and the electrolyte 10, set in motion by the gases generated, is driven radially outward between the electrodes and toward the flanges 6 it first encounters the flat surface 12 of the ridge on the lower side of each electrode and by these surfaces its direction of flow is changed and it is directed against the flat surface 13 where its velocity is decreased. In order to escape from between the electrodes it must again change its direction of flow after encountering the surface 13 and flow along the surface 13 but its direction is again changed by the flange 6 which acts to a large extent as a baffle. As a result of these changes in its direction of movement and of the tortuous path through which it has been compelled to flow, the electrolyte is moving with a very low velocity by the time it reaches the flanges 6 and instead of being ejected violently from between the flanges and into contact with the iron tank 1 the greater portion of it drops back and returns through the crimps or corrugations 11 to its normal place between the electrodes 5.

My invention may be embodied in many other forms than that disclosed and I therefore do not limit my arrangement to the precise arrangement disclosed except in so far as it is limited by the scope of the annexed claims.

What I claim as new and desire to secure by Letters Patent of the United States, is,

1. An electrolytic cell comprising electrodes having electrolyte between them, said electrodes being shaped to form a tortuous path for electrolyte flowing radially of said electrodes, whereby the escape of said electrolyte from between said electrodes is hindered.

2. An electrolytic cell comprising electrodes having electrolyte between them, said electrodes having obstructions in the space between said electrodes to hinder radial flow of said electrolyte from between said electrodes.

3. An electrolytic cell comprising electrodes mounted with their surfaces substantially parallel and having electrolyte between them, said electrodes having circumferential wavy portions which form baffles to hinder radial flow of said electrolyte from between said electrodes.

4. An electrolytic cell comprising electrodes mounted with their surfaces substantially parallel and having electrolyte between them, said electrodes being crimped to hinder escape of said electrolyte from between said electrodes.

5. An electrolytic cell comprising electrodes with substantially parallel surfaces and having electrolyte between them, each electrode being creased near the edge to form a circumferential trough in one surface and a projection on the other surface of said electrode, said projections and troughs being in registry to form baffles for radially flowing electrolyte.

6. An electrolytic cell comprising electrodes mounted with their surfaces substantially parallel and having electrolyte between them, each electrode having a circumferential corrugation, said corrugations being in alinement to form a bend in the passage between electrodes through which radially flowing electrolyte must pass, whereby escape of electrolyte from between said electrodes is hindered.

7. An electrolytic cell comprising cup-shaped electrodes containing electrolyte, each electrode having above the level of the electrolyte a wavy surface to hinder escape of the electrolyte.

8. An electrolytic cell comprising cup-shaped electrodes having a flange at the edge and containing electrolyte, and means for engaging the flanges of said electrodes to support said electrodes in fixed relation to one another, each electrode having between its flange and the surface of the electrolyte in said electrode a wavy portion to hinder escape of the electrolyte.

In witness whereof, I have hereunto set my hand this third day of October 1911.

ALLEN G. JONES.

Witnesses:
F. W. PATERSON,
W. M. SHEPARD.